United States Patent
Murphree

(10) Patent No.: US 9,169,823 B2
(45) Date of Patent: Oct. 27, 2015

(54) MAGNETOSTRICTIVE WAVE ENERGY HARVESTER WITH HEAVE PLATE

(71) Applicant: Oscilla Power Inc., Salt Lake City, UT (US)

(72) Inventor: Zachary Murphree, Dallas, TX (US)

(73) Assignee: Oscilla Power, Inc., Seattle, WA (US)

( * ) Notice: Subject to any disclaimer, the term of this patent is extended or adjusted under 35 U.S.C. 154(b) by 83 days.

(21) Appl. No.: 13/928,035

(22) Filed: Jun. 26, 2013

(65) Prior Publication Data

US 2013/0341927 A1     Dec. 26, 2013

Related U.S. Application Data

(60) Provisional application No. 61/664,444, filed on Jun. 26, 2012.

(51) Int. Cl.
F03B 13/20     (2006.01)

(52) U.S. Cl.
CPC . F03B 13/20 (2013.01); *Y02E 10/38* (2013.01)

(58) Field of Classification Search
CPC .......... F03B 13/14; F03B 13/20; Y02E 10/38
USPC ......................................... 290/42, 53; 310/26
See application file for complete search history.

(56) References Cited

U.S. PATENT DOCUMENTS

| | | | |
|---|---|---|---|
| 6,229,225 B1 * | 5/2001 | Carroll | 290/53 |
| 6,392,314 B1 * | 5/2002 | Dick | 290/53 |
| 7,323,790 B2 * | 1/2008 | Taylor et al. | 290/42 |
| 7,594,780 B2 | 9/2009 | Bull | |
| 7,649,276 B2 * | 1/2010 | Kornbluh et al. | 290/53 |
| 7,877,994 B2 | 2/2011 | Bull et al. | |
| 7,909,536 B2 | 3/2011 | Dick | |
| 8,723,355 B2 * | 5/2014 | Eder et al. | 307/9.1 |
| 2007/0257491 A1 * | 11/2007 | Kornbluh et al. | 290/53 |
| 2007/0286683 A1 * | 12/2007 | Bull et al. | 405/195.1 |
| 2010/0117366 A1 * | 5/2010 | Rhinefrank et al. | 290/53 |
| 2011/0089697 A1 * | 4/2011 | Nair | 290/53 |
| 2011/0113771 A1 * | 5/2011 | Foster et al. | 60/501 |
| 2014/0232116 A1 * | 8/2014 | Thomson et al. | 290/53 |

FOREIGN PATENT DOCUMENTS

| | | |
|---|---|---|
| EP | 1439306 | 7/2004 |
| EP | 1295031 | 3/2006 |
| WO | 2007130331 | 11/2007 |
| WO | 2007130385 | 11/2007 |
| WO | 2010096195 | 8/2010 |
| WO | 2012106558 | 8/2012 |

* cited by examiner

*Primary Examiner* — Tulsidas C Patel
*Assistant Examiner* — Viet Nguyen
(74) *Attorney, Agent, or Firm* — Jeffrey T. Holman

(57) ABSTRACT

A device for generating electricity includes a buoyant structure, a heave plate, at least one load carrying structure that is mechanically coupled to both the buoyant structure and the heave plate, and at least one magnetostrictive element. The magnetostrictive element is configured to to experienceforce changes applied by the load carrying structure caused by hydrodynamic forces acting on the device.

16 Claims, 3 Drawing Sheets

MAGNETOSTRICTIVE WAVE ENERGY HARVESTER WITH HEAVE PLATE

CROSS-REFERENCE TO RELATED APPLICATIONS

This application claims the benefit of U.S. Provisional Application No. 61/664,444, filed on Jun. 26, 2012, which is incorporated by reference herein in its entirety.

BACKGROUND

Heave plates (aka baffle plates or water entrapment plates) have been used extensively in the offshore space in order to damp the heave response of a body in a wave environment. The principle of operation is that the large plates, which are disposed such that their largest projected area is in a plane that is perpendicular to the heave direction, are attached below the surface of the water to limit (e.g., delay, dampen, decrease, etc.) motion in the heave direction. This adds to the effective mass of the system by adding a considerable drag force to the system at the location of the plate. In order for the plate to move in heave, the water around the plate must also be accelerated.

SUMMARY

Embodiments of a device for generating electricity are described. A device for generating electricity includes a buoyant structure, a heave plate, at least one load carrying structure that is mechanically coupled to both the buoyant structure and the heave plate, and at least one magnetostrictive element. The magnetostrictive element is configured to to experience-force changes applied by the load carrying structure caused by hydrodynamic forces acting on the device.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
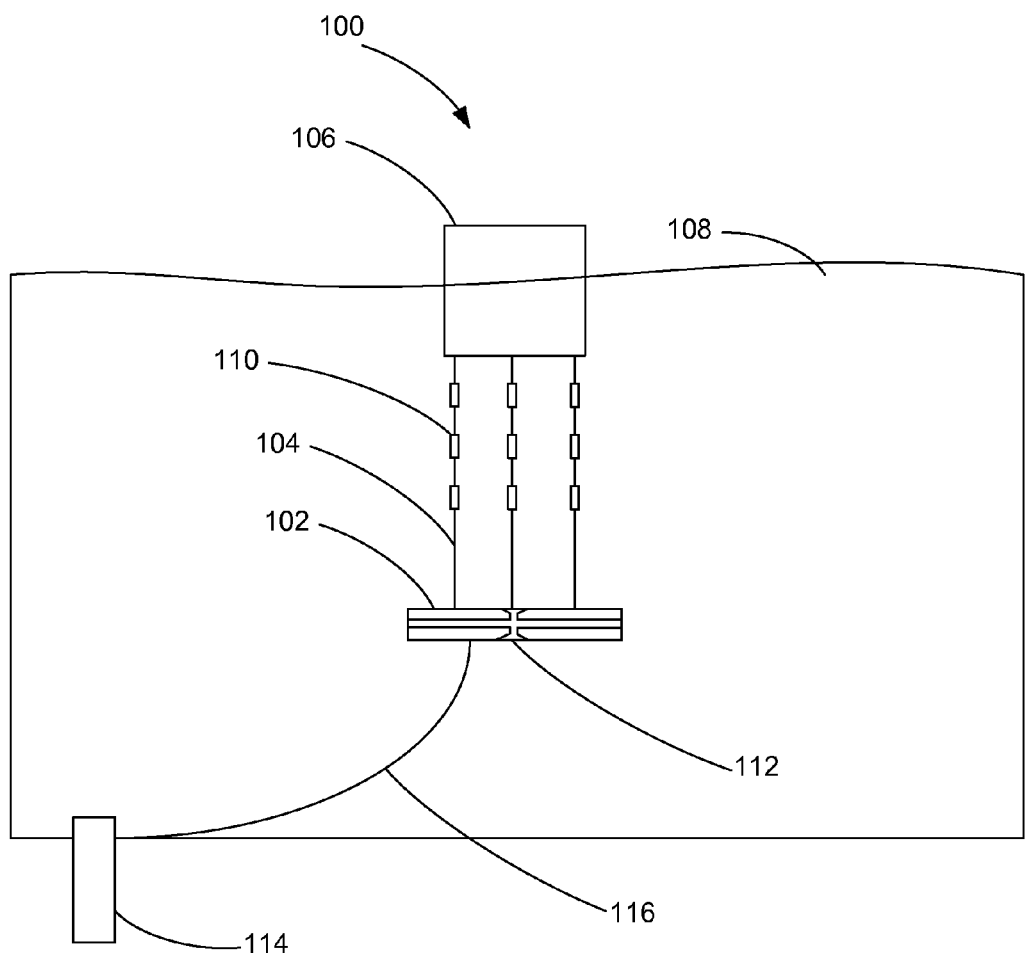
FIG. 1 depicts an embodiment of a device for generating electricity for use with a heave plate.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Heave plates (aka baffle plates or water entrapment plates) have been used extensively in the offshore space in order to damp the heave response of a body in a wave environment. The principle of operation is that the large plates, which are disposed such that their largest projected area is in a plane that is perpendicular to the heave direction, are attached below the surface of the water to limit (e.g., delay, dampen, decrease, etc.) motion in the heave direction. This increases the added mass of the system by adding a considerable drag force to the system at the location of the plate. In order for the plate to move in heave, the water around the plate must also be accelerated. The area and configuration of the plate are designed in order to optimize this increase in added mass. This increase lowers the natural frequency of the system, and essentially creates a high-pass filter that will respond to very low frequency waves (i.e., tidal waves), but not significantly to the regular ocean waves caused by wind. The heave plate is also generally disposed at a depth where the motion of the waves is much more attenuated than at the surface.

Heave plates can be used in wave energy converters (WECs) to provide what is essentially an inertial reference for the device other than the ocean floor. This is important because WECs rely on relative motion caused by waves to produce energy. WEC systems that have used this concept in the past are spar buoys that include a heave plate as part of the spar structure, where the heave plate and spar buoy move relative to each other to create energy.

An embodiment of a device is a taut-moored concept that could benefit greatly from the use of heave plates. This is different from conventional spar buoy implementations because the taut-moored implementation relies on the damped motion of the heave plate to create tension changes in the tether (not on the large relative motions necessary for other systems to create energy).

FIG. 1 depicts an embodiment of a device 100 for generating electricity for use with a heave plate 102. In one embodiment, the heave plate 102 is a simple plate with taut tether(s) 104 extending upwards that connect to a surface float 106, floating in water 108. The plate 102 may be either a solid surface, or may contain perforations 112 or be perforated such that water 108 can flow through it, albeit it in a restricted manner.

One or more power take-off (PTO) modules 110 may be deployed in the float 106, along the tether 104, at the heave plate 102, or a combination of any of these three. The tether system allows this heave plate 102 to be deployed deeper than those that are rigidly fixed to the buoy 106, which increases the effect of the heave damping. In one embodiment, the mass of the heave plate 102 is balanced against the buoyancy of the surface float 106 in order to maintain a tensile load in the tethers 104 across all expected wave conditions. The frequency response of this system is also tuned such that the plate 102 does not respond to waves during normal operation, but will move in order to fully or partially accommodate extreme wave events, and will respond the very low frequency events such as tidal variation. In some embodiments, the heave plate has a natural period that is higher than the period of the most prevalent wave at the site in which the device is deployed. In some embodiments, the heave plate has a natural period that is at least 1.5 times higher than the period of the most prevalent wave at the site in which the device is deployed. FIG. 1 also depicts an anchor 114 connected 116 to the heave plate 102.

The heave plate configuration greatly simplifies the mooring system of a taut-moored PTO module. The plate allows replacement of one or more mooring points on the ocean floor with a single (or multiple) catenary system. Without the heave plate, the mooring itself must carry the entire load present in the tethers, which requires substantial engineering effort. The heave plate system allows for the mooring point(s) to be sized in order to perform at a level sufficient for station-keeping, but does not have to carry the entire load.

The taut moorings of an embodiment of the system require that the tethers 104 always be maintained in tension. The highest probability of system failure occurs if the tethers are ever allowed to go slack. As the tension is reestablished after such a "slack event", a snap load will be applied to the system with potentially catastrophic consequences. The heave plate 102 can be further tailored to help avoid such events. This may be accomplished by making the response of the heave plate asymmetric, such that the heave plate responds differently when the applied motion is up or down.

Figure 2:
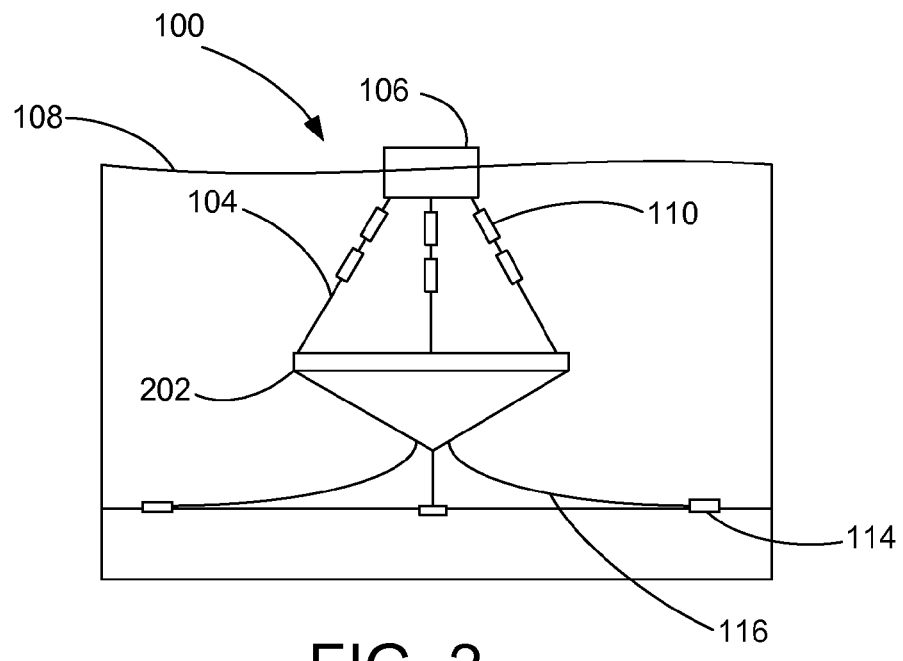
FIG. 2 depicts one embodiment of a device for generating electricity with an asymmetric heave plate.

FIG. 2 depicts one embodiment of a device 100 for generating electricity with an asymmetric heave plate 202. In one embodiment, a plate 202 is more streamlined in one direction, i.e., the coefficient of drag is lower when the plate motion is in one direction. This configuration might look similar to that depicted in FIG. 2. In this figure, the plate entraps a significantly larger volume of water when the buoy 106 is pulling it towards the surface (the added mass of the displaced water with the plate is very large), but the plate 202 can move more easily downward as the tension is decreased (the added mass of the displaced water with the plate is relatively small in the downward direction). This allows the plate 202 to fall through the water more easily than it can rise, which may allow the system to accommodate more extreme wave events. If the buoy were to go from crest to trough in an extreme wave, this asymmetric design would allow the plate to accelerate downward, which would aid in maintaining a tensile load on the tethers, and therefore increase survivability.

In one embodiment, the perforations 112 that are mentioned in the description of the symmetric plate 102 could also be tailored to be asymmetric 202, such that the perforations 112 themselves restrict the flow of water 108 in one direction more than the other. This could be accomplished by a specific orientation of angle-iron or some other three-dimensional plate configuration.

Figure 3:
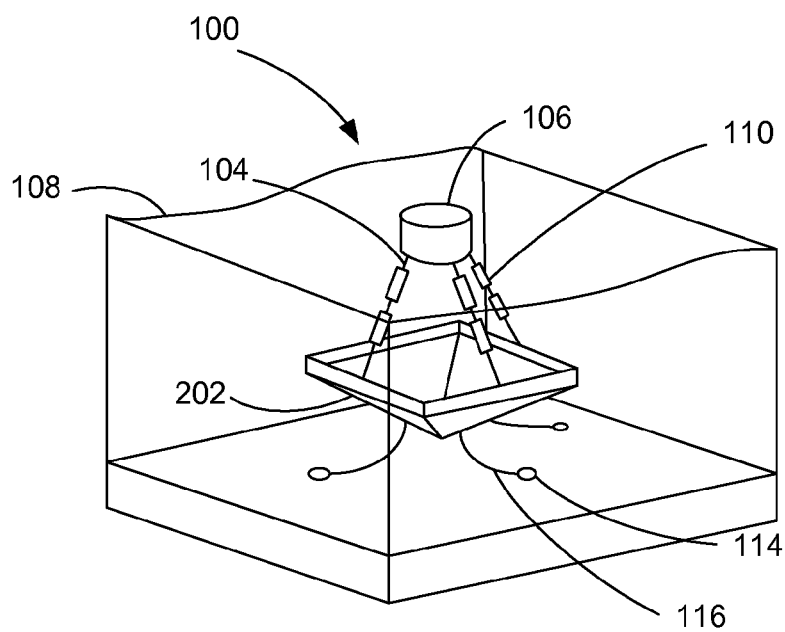
FIG. 3 depicts one embodiment of a device for generating electricity with an asymmetric heave plate from an alternate view.

FIG. 3 depicts one embodiment of a device 100 for generating electricity with an asymmetric heave plate 202 from an alternate view. FIG. 3 depicts many of the same features as FIGS. 1 and 2.

Figure 4:
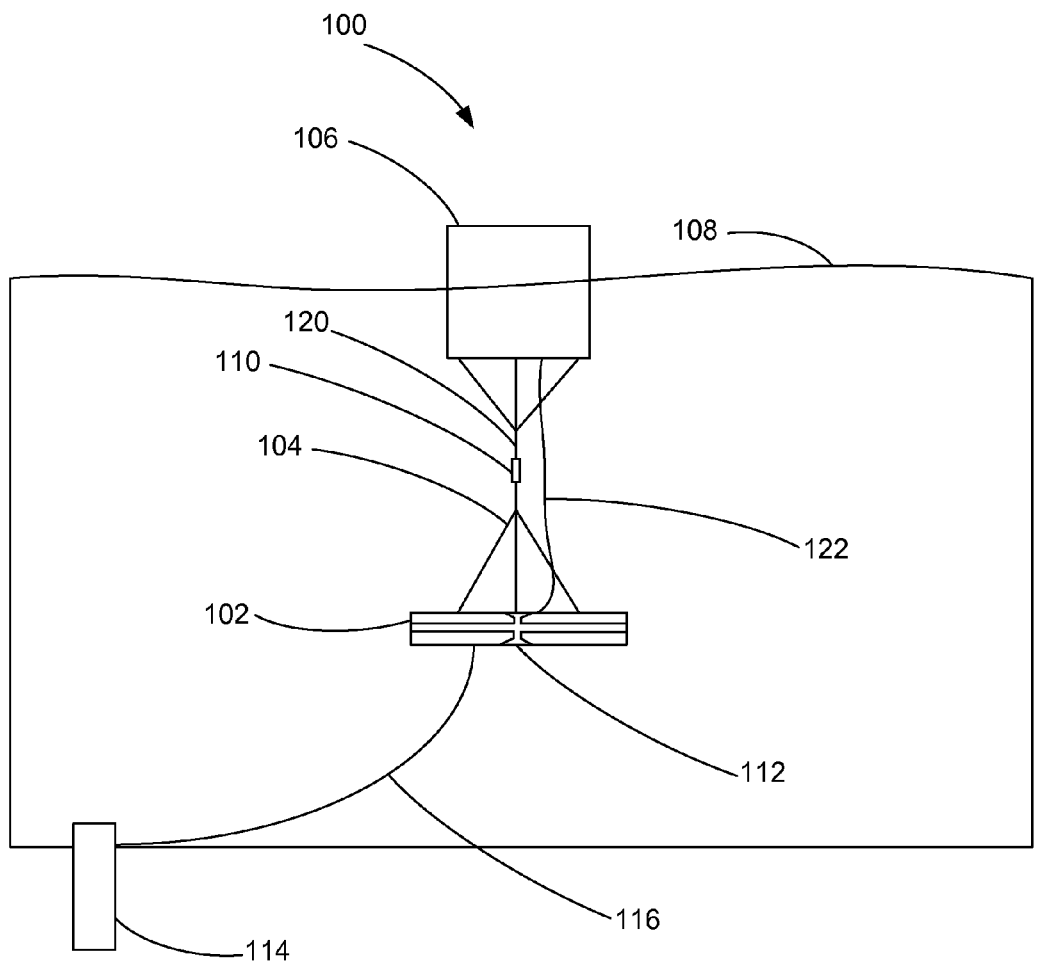
FIG. 4 depicts one embodiment of a device for generating electricity with a slack safety line between the heave plate and the buoy.

FIG. 4 depicts one embodiment of a device 100 for generating electricity with a slack safety line 122 between the heave plate 102 and the buoy 106. In some embodiments, the configuration may also be modified to accommodate any number of PTO modules, for example, a single large PTO module 110, as shown in FIG. 4. In this case, there are multiple tethers 104 from the edge of both the heave plate 102 and the buoy 106 that merge into a single line 120 before attaching to the PTO 110. This enhances the stability of both the plate 102 and buoy 106 by constraining some of their respective pitch and roll motions. Alternatively, depending on the design of the heave plate 102 and supporting structural elements, there may be fewer (e.g., a single tether) or more tethers connected to the heave plate structure. This embodiment also includes a slack safety line 122 between the heave plate 102 and the buoy 106 that would only engage in the event that the taut connection between the plate 102 and buoy 106 failed.

Some embodiments of the present invention comprise a device for generating electricity, the device comprising: at least one magnetostrictive element, at least one buoyant device (or buoy), at least one heave plate and when deployed in a body of water, the interaction of waves with at least one buoy causes changes in the strain of one or more magnetostrictive elements; and one or more electrically conductive coils or circuits within the vicinity of one or more of the magnetostrictive elements, wherein a corresponding change in magnetic flux density in the one or more magnetostrictive elements generates an electric voltage and/or electric current in the one or more electrically conductive coils or circuits, wherein there is no substantial relative motion between the one or more magnetostrictive elements and the one or more electrically conductive coils or circuits.

Some embodiments may further comprise at least one anchor device located in a substantially fixed location below a surface of the body of water, wherein a first end of the buoy or a first end of the heave plate is coupled to the anchor device.

Some embodiments may further comprise at least one rigid tether coupled between the one or more magnetostrictive elements and the buoyant device.

Some embodiments may comprise at least one battery coupled to the one or more electrically conductive coils or circuits, the battery to store at least some of the electrical energy generated in the one or more electrically conductive coils or circuits.

In some embodiments, the at least one magnetostrictive element may be part of at least one magnetic flux path.

In some preferred embodiments, the at least one magnetostrictive element may be part of at least one substantially closed magnetic flux path with all components in the flux path having a relative permeability in excess of 10. In some preferred embodiments, the at least one magnetostrictive element may be part of at least one substantially closed magnetic flux path with all components in the flux path having a relative permeability in excess of 50.

In some embodiments, each of the one or more magnetostrictive elements comprises a magnetostrictive rod.

In some embodiments, at least one electrically conductive coil or circuit comprises a polymer coated copper coil wrapped around the magnetostrictive rod.

Some embodiments of the present invention comprise a method for generating electricity, the method comprising: utilizing the motion of a body of water, including wave motion, to cause changes in the strain of one or more magnetostrictive elements deployed with one end mechanically coupled to a buoyant device (or buoy) and the other end mechanically coupled to a heave plate; and using a corresponding change in magnetic flux density in the magnetostrictive elements to generate an electric voltage and/or electric current in one or more electrically conductive coils or circuits that are in the vicinity of the magnetostrictive elements, wherein there is no substantial relative motion between the one or more magnetostrictive elements and the one or more electrically conductive coils or circuits.

Some embodiments comprise utilizing the motion of the body of water, including the wave motion, comprises utilizing motion of one or more buoys, which in turn causes changes in the strain of one or more magnetostrictive elements to which one or more buoys and/or heave plates may be coupled mechanically; and using a corresponding change in magnetic flux density in the magnetostrictive elements to generate an electric voltage and/or electric current in one or more electrically conductive coils or circuits that are in the vicinity of the magnetostrictive elements.

Some embodiments comprise a device for generating electricity, wherein the device comprises: a buoy deployed in a body of water; a magnetostrictive element mechanically coupled to at least one buoy and at least one heave plate, wherein the motion of the body of water, including wave motion, causes motion of the buoy, which in turn causes changes in the strain of the magnetostrictive element; and an electrically conductive coil or circuit within the vicinity of the magnetostrictive element, wherein a corresponding change in magnetic flux density in the magnetostrictive element generates an electric voltage and/or electric current in the electrically conductive coil or circuit, wherein there is no substantial relative motion between the one or more magnetostrictive elements and the one or more electrically conductive coils or circuits.

Other embodiments may incorporate one or more other aspects from related descriptions, including the subject matter described and shown in U.S. application Ser. No. 13/541,250, filed on Jul. 3, 2012, and entitled "Apparatus for Harvesting Electrical Power from Mechanical Energy," which is incorporated herein in its entirety.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device for generating electricity, the device comprising:
   a buoyant structure;
   a heave plate having an asymmetric geometry to facilitate a first level of resistance to movement in an upward direction and a second level of resistance in a downward direction, wherein the heave plate comprises a concave geometry on an upward surface, wherein the first level of resistance is higher than the second level of resistance;
   at least one load carrying structure that is mechanically coupled to both the buoyant structure and the heave plate, wherein the at least one load carrying structure is configured to taut-moor the heave plate to the buoyant structure;
   at least one magnetostrictive element wherein the magnetostrictive element is configured to experience force changes applied by the load carrying structure caused by hydrodynamic forces acting on the device.

2. The device in claim 1, wherein the heave plate is disposed at a depth in water wherein a motion of the waves at the depth is more attenuated than a motion of the waves at a surface of the water.

3. The device of claim 1, further comprising at least one anchor device coupled to the device, wherein the anchor device is configured to provide station-keeping of the device relative to an anchor point.

4. The device of claim 1, wherein the heave plate comprises perforations, wherein the perforations facilitate a first level of resistance to movement of the heave plate in a first direction and a second level of resistance to movement of the heave plate in a second direction, wherein the first and second levels of resistance are different from each other.

5. The device of claim 1, wherein the load carrying structure comprises a tether.

6. The device of claim 1, further comprising one or more electrically conductive circuits coupled to the magnetostrictive element, wherein a change in magnetic flux density in the magnetostrictive element generates an electric voltage in the one or more electrically conductive circuits.

7. The device of claim 6, further comprising an electrical energy storage device coupled to the one or more electrically conductive circuits, wherein the electrical energy storage device stores at least some electrical energy generated in the one or more electrically conductive circuits.

8. The device of claim 1, wherein the magnetostrictive element comprises a magnetostrictive rod.

9. A method for generating electricity, the method comprising:
   utilizing the motion of a body of water to cause changes in the strain of one or more magnetostrictive elements deployed with one end mechanically coupled to a buoyant structure and the other end mechanically coupled to a heave plate to form a taut-moored connection between the buoyant structure and the heave plate, wherein the heave plate comprises an asymmetric geometry to facilitate a first level of resistance to movement in an upward direction and a second level of resistance in a downward direction, wherein the heave plate comprises a concave geometry on an upward surface, wherein the first level of resistance is higher than the second level of resistance; and using a corresponding change in magnetic flux density in the magnetostrictive elements to generate an electric voltage in one or more electrically conductive coils near the magnetostrictive elements.

10. The method of claim 9, wherein there is no substantial relative motion between the one or more magnetostrictive elements and the one or more electrically conductive coils.

11. The method of claim 9, wherein the heave plate is disposed at a depth in water wherein a motion of the waves at the depth is more attenuated than a motion of the waves at a surface of the water.

12. The method of claim 9, wherein the one or more magnetostrictive elements are part of at least one magnetic flux path.

13. The method of claim 9, wherein the one or more magnetostrictive elements are part of at least one substantially closed magnetic flux path.

14. The method of claim 9, wherein the method further comprises storing at least some electrical energy generated in the one or more electrically conductive coils.

15. A device for generating electricity, the device comprising:

a buoyant structure deployed in a body of water;

at least one heave plate;

at least one magnetostrictive element mechanically coupled to the buoyant structure and the heave plate to form a taut-moored connection between the buoyant structure and the heave plate, wherein the heave plate comprises an asymmetric geometry to facilitate a first level of resistance to movement in an upward direction and a second level of resistance in a downward direction, wherein the heave plate comprises a concave geometry on an upward surface, wherein the hydrodynamic interaction of the buoyant structure and the heave plate with the body of water causes changes in the strain of the magnetostrictive element, wherein the first level of resistance is higher than the second level of resistance; and an electrically conductive coil or circuit coupled to the magnetostrictive element, wherein a corresponding change in magnetic flux density in the magnetostrictive element generates an electric voltage and electric current in the electrically conductive coil or circuit.

16. The device of claim 15, wherein there is no substantial relative motion between the magnetostrictive element and the electrically conductive coil or circuit.

* * * * *